United States Patent
Wang et al.

(10) Patent No.: US 10,816,656 B2
(45) Date of Patent: Oct. 27, 2020

(54) VITAL SIGN SENSOR CAPABLE OF RESISTING CLUTTER

(71) Applicant: NATIONAL SUN YAT-SEN UNIVERSITY, Kaohsiung (TW)

(72) Inventors: Fu-Kang Wang, Kaohsiung (TW); Tzyy-Sheng Horng, Kaohsiung (TW); Lih-Tyng Hwang, Kaohsiung (TW); Chung-Yi Hsu, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 213 days.

(21) Appl. No.: 16/106,285

(22) Filed: Aug. 21, 2018

(65) Prior Publication Data
US 2019/0377080 A1 Dec. 12, 2019

(30) Foreign Application Priority Data
Jun. 7, 2018 (TW) .............................. 107119676 A

(51) Int. Cl.
*G01S 13/44* (2006.01)
*G01S 13/524* (2006.01)
(Continued)

(52) U.S. Cl.
CPC ........ *G01S 13/449* (2013.01); *G01S 13/5244* (2013.01); *G01S 13/88* (2013.01); *H01Q 15/244* (2013.01)

(58) Field of Classification Search
CPC combination set(s) only.
See application file for complete search history.

(56) References Cited

U.S. PATENT DOCUMENTS 9,375,153 B2 *  6/2016  Horng ................ G08B 13/2491
9,448,053 B2 *  9/2016  Jau ..................... G08B 13/2491
(Continued)

FOREIGN PATENT DOCUMENTS

EP          2359478 B1      8/2013
TW       201351353 A      12/2013
(Continued)

OTHER PUBLICATIONS

A Fast Clutter Cancellation Method in Quadrature Doppler Radar for N oncontact Vital Signal Detection (Year: 2010).*
(Continued)

*Primary Examiner* — Mamadou L Diallo
(74) *Attorney, Agent, or Firm* — Demian K. Jackson; Jackson IPG PLLC

(57) ABSTRACT

In a vital sign sensor of the present invention, an antenna assembly radiates an oscillation signal generated by a SIL oscillator to an object in a form of a wireless signal and receives a reflected signal from the object, and the reflected signal can have the SIL oscillator injection-locked. The wireless signal radiated from the antenna assembly is transmitted to a demodulator for demodulation such that the vital signs of the object can be obtained. Additionally, an isolator of the antenna assembly is provided to prevent the SIL oscillator from receiving a clutter reflected from the demodulator and an environment where the demodulator is placed. As a result, the clutter can't influence the vital sign detection of the object.

10 Claims, 7 Drawing Sheets

(51) Int. Cl.
*H01Q 15/24* (2006.01)
*G01S 13/88* (2006.01)

(56) References Cited

U.S. PATENT DOCUMENTS

| | | | | |
|---|---|---|---|---|
| 9,603,555 | B2* | 3/2017 | Horng | A61B 5/113 |
| 2010/0198083 | A1* | 8/2010 | Lin | A61B 5/6823 |
| | | | | 600/484 |
| 2010/0245091 | A1* | 9/2010 | Singh | A61B 5/0022 |
| | | | | 340/573.1 |
| 2014/0024917 | A1* | 1/2014 | McMahon | A61B 5/7225 |
| | | | | 600/407 |
| 2015/0241555 | A1* | 8/2015 | Lin | A61B 5/0816 |
| | | | | 702/56 |
| 2017/0102457 | A1* | 4/2017 | Li | G01S 7/35 |
| 2017/0173262 | A1* | 6/2017 | Veltz | G16H 20/17 |
| 2018/0081030 | A1* | 3/2018 | McMahon | G01S 13/87 |
| 2018/0083358 | A1 | 3/2018 | Wang et al. | |
| 2018/0235481 | A1* | 8/2018 | Liu | G01S 13/583 |
| 2019/0175117 | A1* | 6/2019 | Tseng | A61B 5/05 |

FOREIGN PATENT DOCUMENTS

| | | |
|---|---|---|
| TW | I493213 | 7/2015 |
| TW | I609192 | 12/2017 |
| TW | I616669 | 3/2018 |

OTHER PUBLICATIONS

Taiwanese Office Action dated Jan. 19, 2019 for Taiwanese Patent Application No. 107119676, 9 pages.

Chung-Yi Hsu et al., Wearable Vital Sign Sensor Using a Single-Input Multiple-Output Self-Injection-Locked Oscillator Tag, IMS2018, Jun. 12, 2018.

* cited by examiner

VITAL SIGN SENSOR CAPABLE OF RESISTING CLUTTER

FIELD OF THE INVENTION

This invention generally relates to a vital sign sensor, and more particularly to a vital sign sensor capable of resisting clutter.

BACKGROUND OF THE INVENTION

Non-contact vital sign detector can radiate wireless signals to the subject and receive a reflected signal containing Doppler shift components caused by vital signs of the subject, and then the non-contact vital sign detector can demodulate the reflected signals to obtain subject's vital sign information.

A motion/interference signal detection system and method thereof was previously disclosed by the inventors of the present invention in Taiwan patent 1493213. An oscillator and a transceiver unit of a transmitter transmits a detection signal to an object, and the object reflects a reflected detection signal to the transceiver unit and the oscillator, so that the oscillator can operate in a self-injection-locked state. Meanwhile, the oscillator and the transceiver unit also can transmit an injection-locking signal to a receiving unit and a demodulation unit of a receiver, and the demodulation unit can demodulate the injection-locking signal to obtain vital sign information of the object. The transmitter may be a small configuration because it only includes the oscillator and the transceiver unit. Owing to the self-injection-locked (SIL) radar has excellent sensitivity, Doppler shift caused by the relative movement between the transmitter and the receiver may inject into and highly influence the oscillator. Consequently, the detection system is difficult to apply in conventional wearable devices.

SUMMARY

The present invention utilizes an isolator in an antenna assembly to protect the SIL oscillator from the influence of clutter reflected by the demodulator and the environment where the demodulator is located, such that object's vital signs can be identified precisely even if there are relative movements between the demodulator and the antenna assembly and between the environment and the antenna assembly.

A vital sign sensor of the present invention is capable of resisting clutter. The vital sign sensor includes a SIL oscillator, an antenna assembly and a demodulator. The SIL oscillator is adapted to generate an oscillation signal.

The antenna assembly, electrically connected with the SIL oscillator, is provided to receive the oscillation signal and radiate a wireless signal to an object. And the antenna assembly is also provided to receive a reflected signal from the object and transmit the reflected signal to the SIL oscillator to allow the SIL oscillator to operate in a self-injection-locked state. The demodulator is used to receive and demodulate the wireless signal radiated from the antenna assembly to obtain a vital signal of the object. The antenna assembly includes an isolator which is provided to prevent the SIL oscillator from receiving a clutter reflected from the demodulator and an environment where the demodulator is placed.

Because of the isolator in the antenna assembly of the present invention, the clutter, reflected from the demodulator and the environment, can't influence the oscillation frequency of the SIL oscillator and the relative movements between the demodulator/the environment and the antenna assembly can't influence the detection of vital signs. For these reasons, the vital sign sensor of the present invention can apply in portable devices.

DETAILED DESCRIPTION OF THE INVENTION

Figure 1:
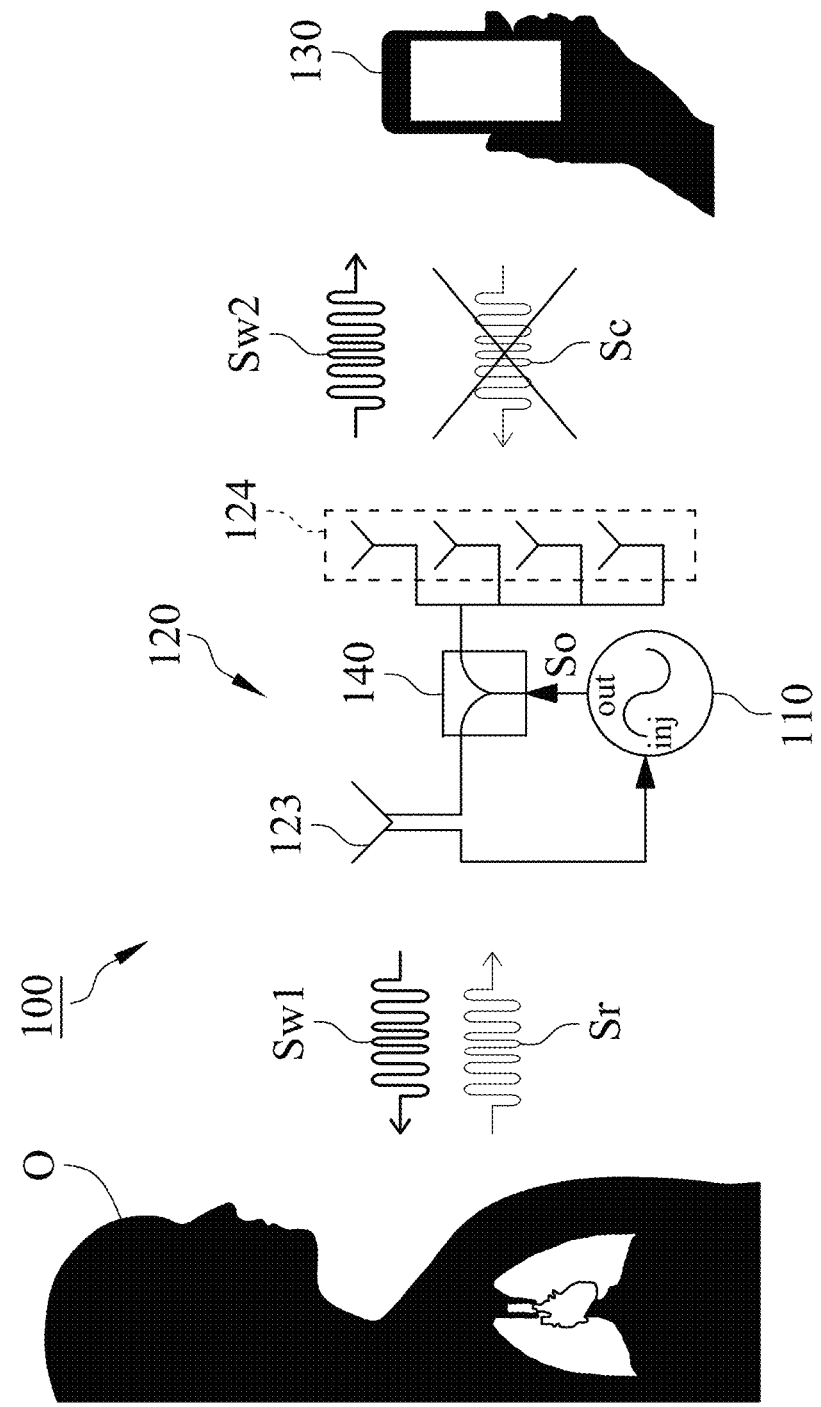
FIG. 1 is a schematic diagram illustrating a vital sign sensor in accordance with a first embodiment of the present invention.

With reference to FIG. 1, a vital sign sensor 100 of a first embodiment of the present invention includes a self-injection-locked (SIL) oscillator 110, an antenna assembly 120, a demodulator 130 and a power splitter 140.

With reference to FIG. 1, the SIL oscillator 110 is provided to output an oscillation signal So, and in the first embodiment, it is a voltage-controlled oscillator which utilizes a input voltage to control an oscillation frequency of the oscillation signal So. The power splitter 140 is electrically connected to the SIL oscillator 110 for splitting the oscillation signal So into two paths.

With reference to FIG. 1, the antenna assembly 120 includes a first antenna 123 and a second antenna 124 which are electrically connected with the power splitter 140. The first antenna 123 receives the oscillator signal So in one path, and the second antenna 124 receives the oscillator signal So in the other path. The first antenna 123, which may be the linearly polarized antenna or circularly polarized antenna, radiates the oscillator signal So an object O in a form of a first wireless signal Sw1. A reflected signal Sr from the object O may be reflected to the first antenna 123 after transmitting the oscillation signal So to the object O. Owing to the vital signs of the object O may cause Doppler shift in the oscillation signal So, the reflected signal Sr also contains the Doppler shift components caused by vital signs of the object O. The reflected signal Sr received by the first antenna 123 is transmitted and input to the SIL oscillator 110 to allow the SIL oscillator 110 to operate in a self-injection-locked (SIL) state and output the oscillator signal So containing Doppler shift components caused by vital signs of the object O.

With reference to FIG. 1, the oscillator signal So is radiated to the demodulator 130 from the second antenna 124 in a form of a second wireless signal Sw2. The oscillation signal So transmitted to the second antenna 124 and the second wireless signal Sw2 radiated from the second antenna 124 both contain the Doppler shift components caused by vital signs of the object O because of the SIL oscillator 110 which operates in the SIL state. Consequently, the demodulator 130 can demodulate and compute the second wireless signal Sw2 to obtain a vital information of the object O. However, if there is a relative movement between the demodulator 130 and the antenna assembly 120 or between an environment where the demodulator 130 is placed and the antenna assembly 120, the demodulator 130 and the environment where the demodulator 130 is placed may reflect a clutter Sc containing Doppler shift components which caused by the relative movement.

The antenna assembly 120 preferably includes an isolator designed to prevent the clutter Sc reflected from the demodulator 130 and the environment from being transmitted to the SIL oscillator 110. The isolator of the antenna assembly 120 in the first embodiment is the second antenna 124 that may be an array antenna with right-hand circular polarization (RHCP) or left-hand circular polarization (LHCP). A RHCP array antenna provided as the second antenna 124 can polarize the oscillation signal So transmitted from the power splitter 140 and output the second wireless signal Sw2 with right-hand circular polarization to the demodulator 130. After the second wireless signal Sw2 with right-hand circular polarization arriving at the demodulator 130, the clutter Sc reflected from the demodulator 130 and the environment where the demodulator 130 is placed is a left-hand circularly polarized wave in quadrature to the oscillation signal So. The second antenna 124 is designed not to receive waves in quadrature to its polarization direction so that the clutter Sc reflected from the demodulator 130 and the environment where the demodulator 130 is placed can't be transmitted to the SIL oscillator 110 to affect oscillation frequency of the SIL oscillator 110. On the other hand, when a LHCP antenna is used as the second antenna 124 to polarize the oscillation signal So, the second antenna 124 can radiate the second wireless signal Sw2 with left-hand circular polarization and resist the clutter Sc with right-hand circular polarization from the demodulator 130 and the environment to avoid oscillation frequency variation of the SIL oscillator 110.

When there is a relative movement between the demodulator 130 and the antenna assembly 120 or between the environment where the demodulator 130 is placed and the antenna assembly 120, the clutter Sc reflected from the demodulator 130 and the environment can't be received by the second antenna 124 having polarization diversity characteristic and can't affect the oscillation frequency of the SIL oscillator 110. As a result, the vital sign sensor 100 of the present invention can resist the clutter Sc. Additionally, the layout area composed of the SIL oscillator 110, the antenna assembly 120 and the power splitter 140 is small and the relative movement between the demodulator 130/the environment and the antenna assembly 120 doesn't interfere the oscillation frequency of the SIL oscillator 110 such that the SIL oscillator 110, the antenna assembly 120 and the power splitter 140 can be arranged together as a portable device and placed on the object O for more convenient detection of the vital signs.

Figure 2:
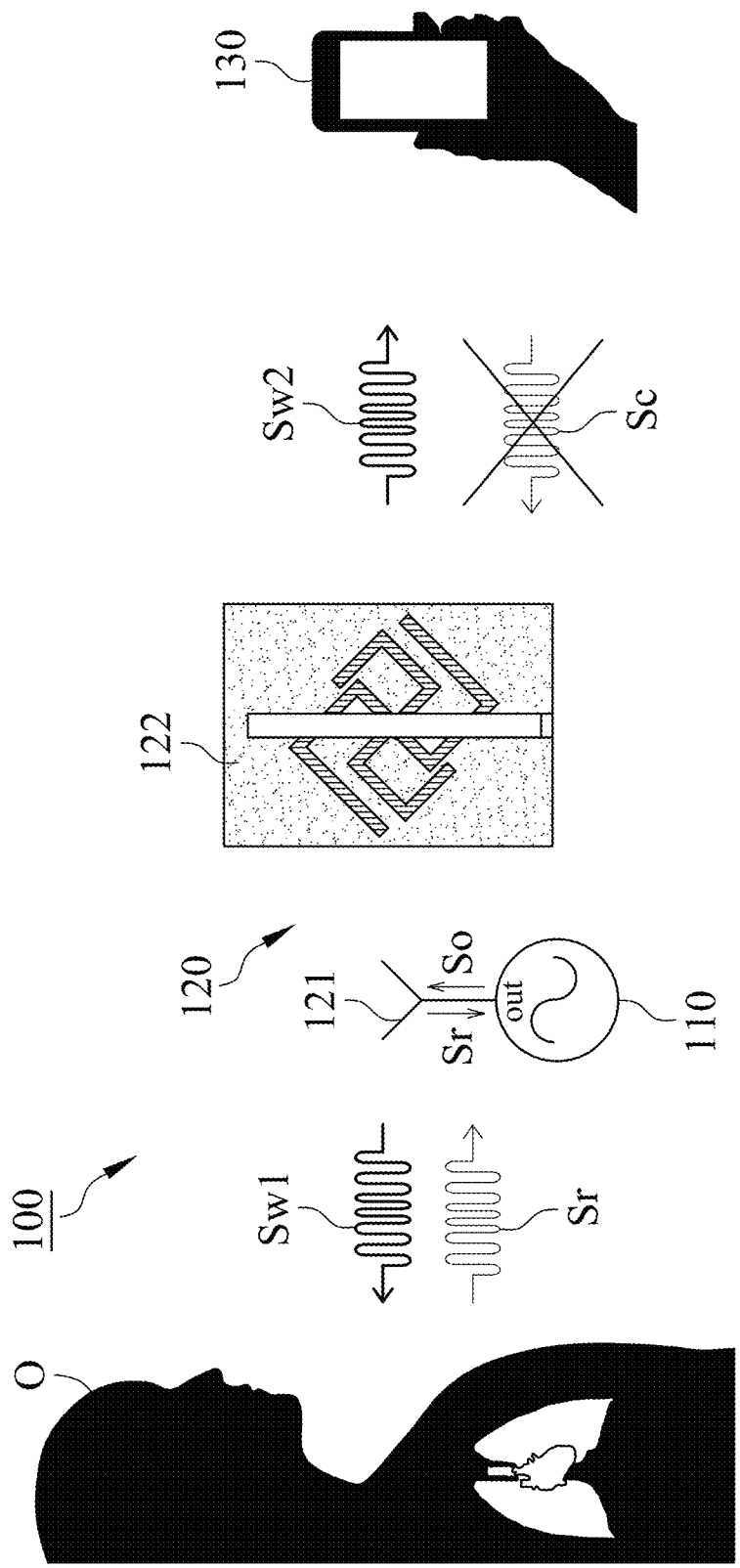
FIG. 2 is a schematic diagram illustrating a vital sign sensor in accordance with a second embodiment of the present invention.

FIG. 2 represents a vital sign sensor of a second embodiment. In the second embodiment, there is only an antenna 121 in the antenna assembly 120, and a frequency selective surface (FSS) 122 is provided as the isolator of the antenna assembly 120. The antenna 121, which may be a linearly polarized antenna with vertical or horizontal polarization, is electrically connected to the SIL oscillator 110 and is configured to radiate the oscillation signal So to the object O in a form of a first wireless signal Sw1 and receive the reflected signal Sr from the object O. The reflected signal Sr containing Doppler shift components caused by the vital signs of the object O is injected into the SIL oscillator 110, as a result, the oscillation signal So output from the SIL oscillator 110 operated in the SIL state also contains Doppler shift components caused by the vital signs of the object O.

With reference to FIG. 2, the FSS 122 is placed in the transmitting path of the first wireless signal Sw1 to the demodulator 130 from the antenna 121. When the antenna 121 polarizes the oscillation signal So to the first wireless signal Sw1 with vertical or horizontal polarization and radiates the first wireless signal Sw1 to the demodulator 130, the first wireless signal Sw1 passing through the FSS 122 is converted to a second wireless signal Sw2 with circular polarization, and then the second wireless signal Sw2 is sent to the object O. Meanwhile, the clutter with circular polarization from the demodulator 130 and the environment where the demodulator 130 is placed is converted to a linearly polarized wave in quadrature to the first wireless signal Sw1 by the FSS 122. Owing to the antenna 121 is designed to not receive signals in quadrature to its polarization direction, the clutter Sc, reflected from the demodulator 130 and the environment where the demodulator 130 is located, can't be received by the antenna 121 to affect the oscillation frequency of the SIL oscillator 110. The FSS 122 may be a metal sheet having specific shape and may be, but not limited to, printed on or placed outside a printed circuit board where the SIL oscillator 110 and the antenna 121 are located.

Figure 3:
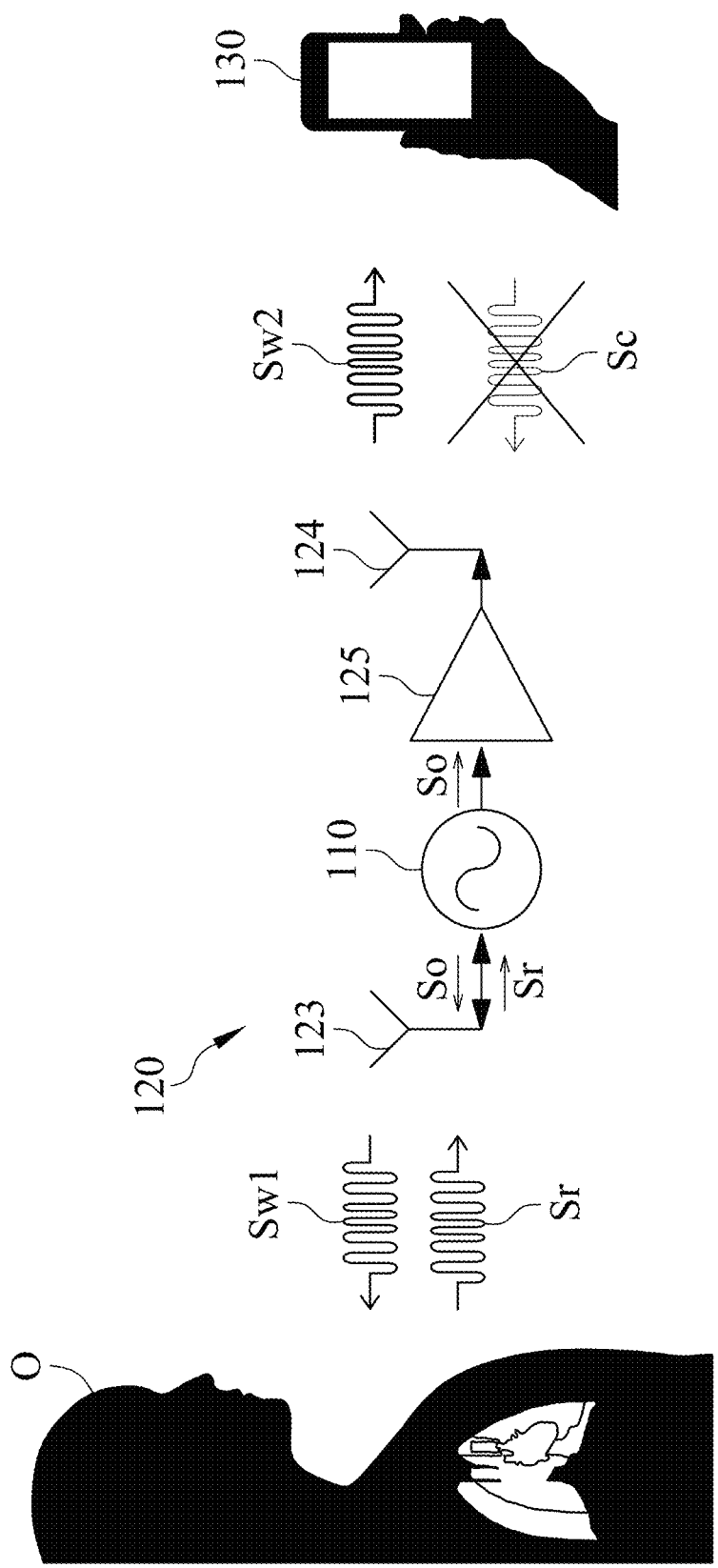
FIG. 3 is a schematic diagram illustrating a vital sign sensor in accordance with a third embodiment of the present invention.

A third embodiment of the present is shown in FIG. 3. The isolator of the antenna assembly 120 is a buffer 125 and there is no restriction in polarization direction of the second antenna 124 in the third embodiment. While the oscillation signal So is transmitted to the object O by the first antenna 123 in a form of a first wireless signal Sw1, the first antenna 123 receives the reflected signal Sr reflected from the object O and injects the reflected signal Sr to lock the SIL oscillator 110. The buffer 125 is electrically connected with the SIL oscillator 110, and the second antenna 124 is coupled to the SIL oscillator 110 via the buffer 125. The oscillation signal So generated from the SIL oscillator 110 is transmitted to the second antenna 124 through the buffer 125, and the second antenna 124 is provided to radiate the oscillation signal So to the demodulator 130 in a form of a second wireless signal Sw2. The clutter Sc from the demodulator 130 and the environment where the demodulator 130 is placed is transmitted to and received by the second antenna 124. However, owing to the isolation of the buffer 125, the clutter Sc received by the second antenna 124 can't be transmitted to the SIL oscillator 110. Otherwise, the buffer 125 can provide gains to increase the output power and decrease the noise interference.

Figure 4:
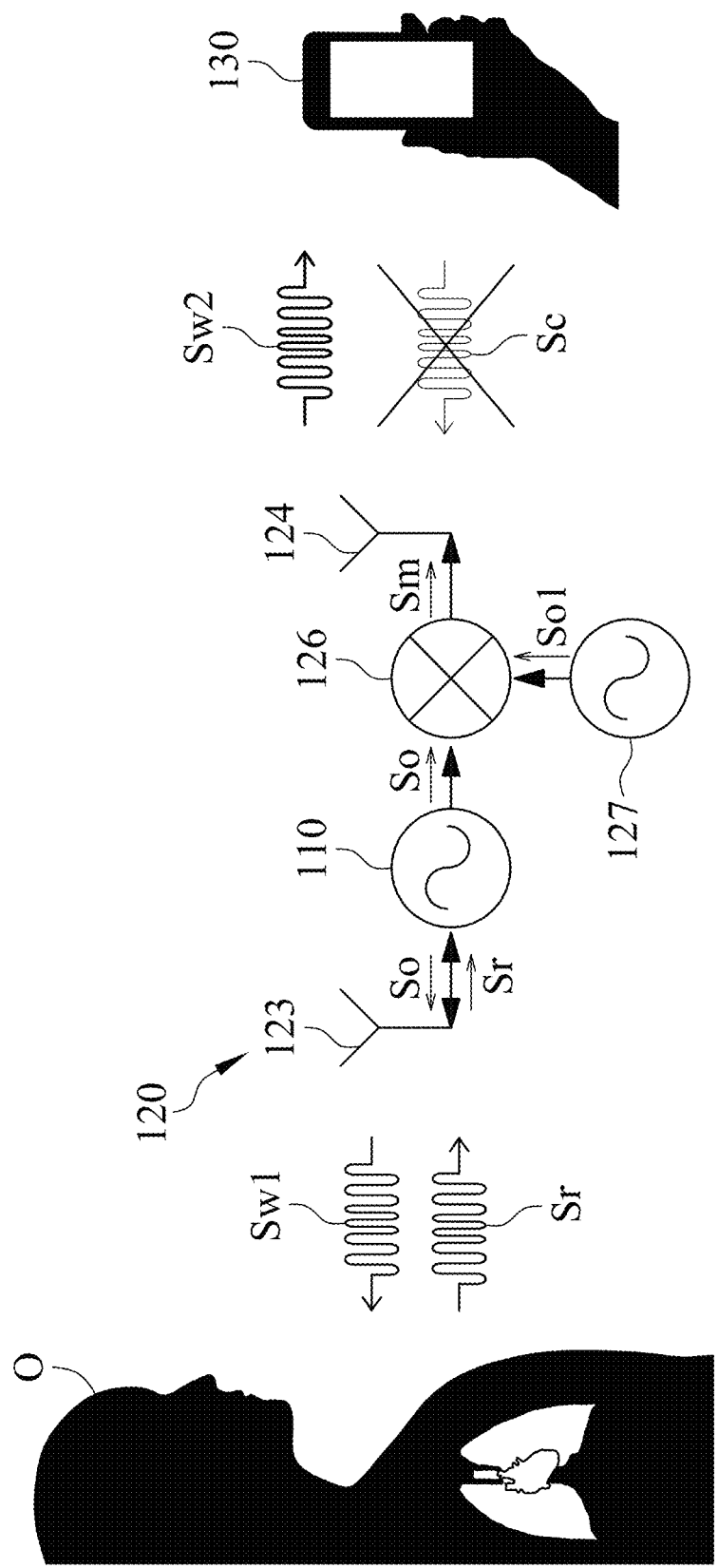
FIG. 4 is a schematic diagram illustrating a vital sign sensor in accordance with a fourth embodiment of the present invention.

FIG. 4 shows the configuration of a fourth embodiment of the present invention. In the fourth embodiment, a frequency mixer 126 and a local oscillator 127 are provided as the isolator of the antenna assembly 120 and the second antenna 124 has no limitation in polarization direction. The first antenna 123 can radiate the oscillation signal So to the object O in a form of a first wireless signal Sw1 and receive the reflected signal Sr from the object O. The reflected signal Sr injects into and locks the SIL oscillator 110. The frequency mixer 126 is electrically connected to the SIL oscillator 110 and the local oscillator 127, and receives and mixes the oscillation signal So from the SIL oscillator 110 and a local oscillation signal Sol from the local oscillator 127 to a frequency mixing signal Sm. The frequency of the frequency mixing signal Sm may be difference or sum of the frequencies of the oscillation signal So and the local oscillation signal Sol. The second antenna 124, electrically connected to the frequency mixer 126, is configured to receive and radiate the frequency mixing signal Sm to the demodulator 130 in a form of a second wireless signal Sw2. The clutter Sc reflected from the demodulator 130 and the environment where the demodulator 130 is located may be transmitted to and received by the second antenna 124, but the difference between the frequency of the clutter Sc and the oscillation frequency of the SIL oscillator is too large to cause frequency modulation in the SIL oscillator 110.

Figure 5:
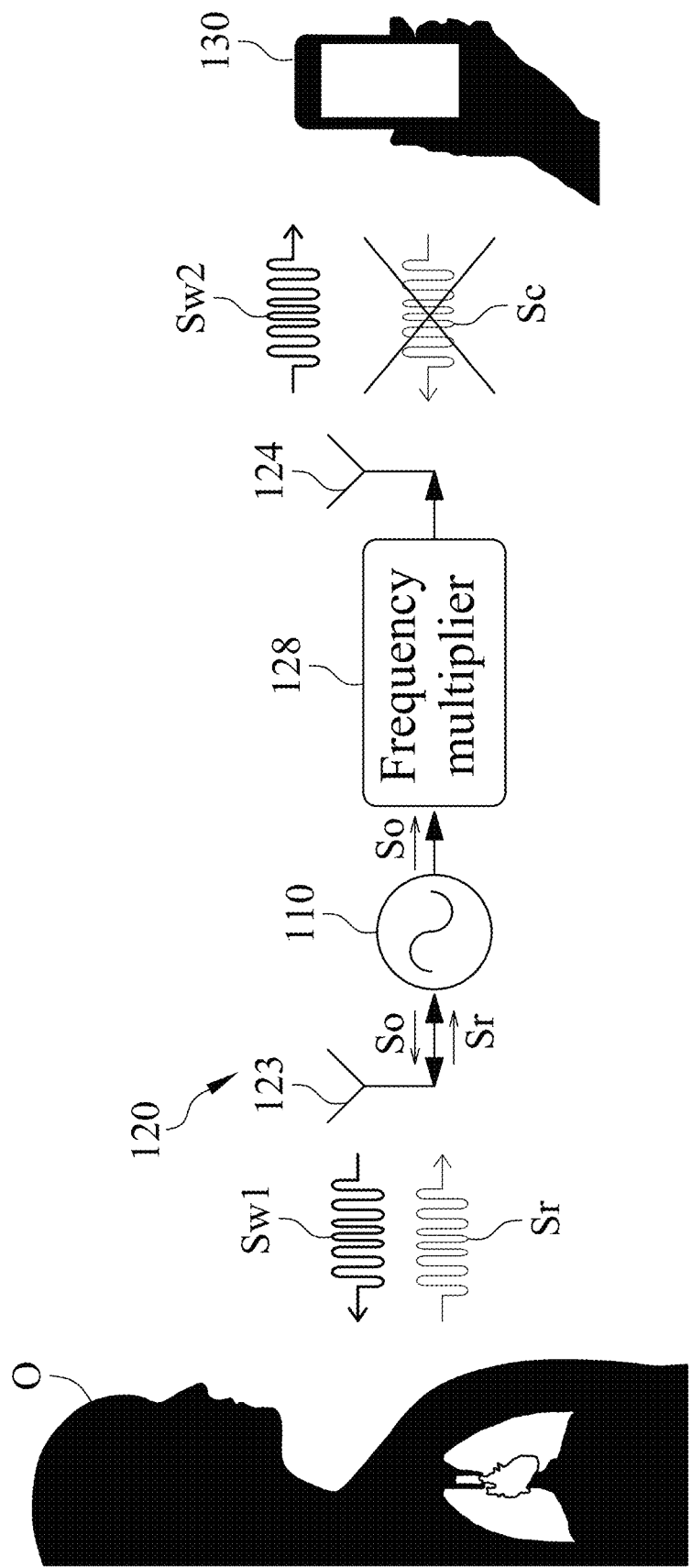
FIG. 5 is a schematic diagram illustrating a vital sign sensor in accordance with a fifth embodiment of the present invention.

As shown in FIG. 5, the isolator of the antenna assembly 120 is a frequency multiplier 128 and the polarization direction of the second antenna 124 is not restricted in a fifth embodiment of the present invention. The SIL oscillator 110 is electrically connected to the first antenna 123 and the frequency mixer 128. The first antenna 123 radiates the oscillation signal So in a form of a first wireless signal Sw1 to the object O, receives the reflected signal Sr from the object O and injects the reflected signal Sr to lock the SIL oscillator 110. The frequency multiplier 128 receives the oscillation signal So from the SIL oscillator 110 and increases a frequency of the oscillation signal So. The second antenna 124 is coupled to the SIL oscillator 110 via the frequency mixer 128, and is able to radiate the frequency-multiplied oscillation signal So to the demodulator 130 in a form of a second wireless signal Sw2 and receive the clutter Sc reflected from the demodulator 130 and the environment where the demodulator 130 is placed. There is no frequency modulation in the SIL oscillator 130 because of a significant difference between the frequency of the reflected clutter Sc and the oscillation frequency of the SIL oscillator 110.

Figure 6:
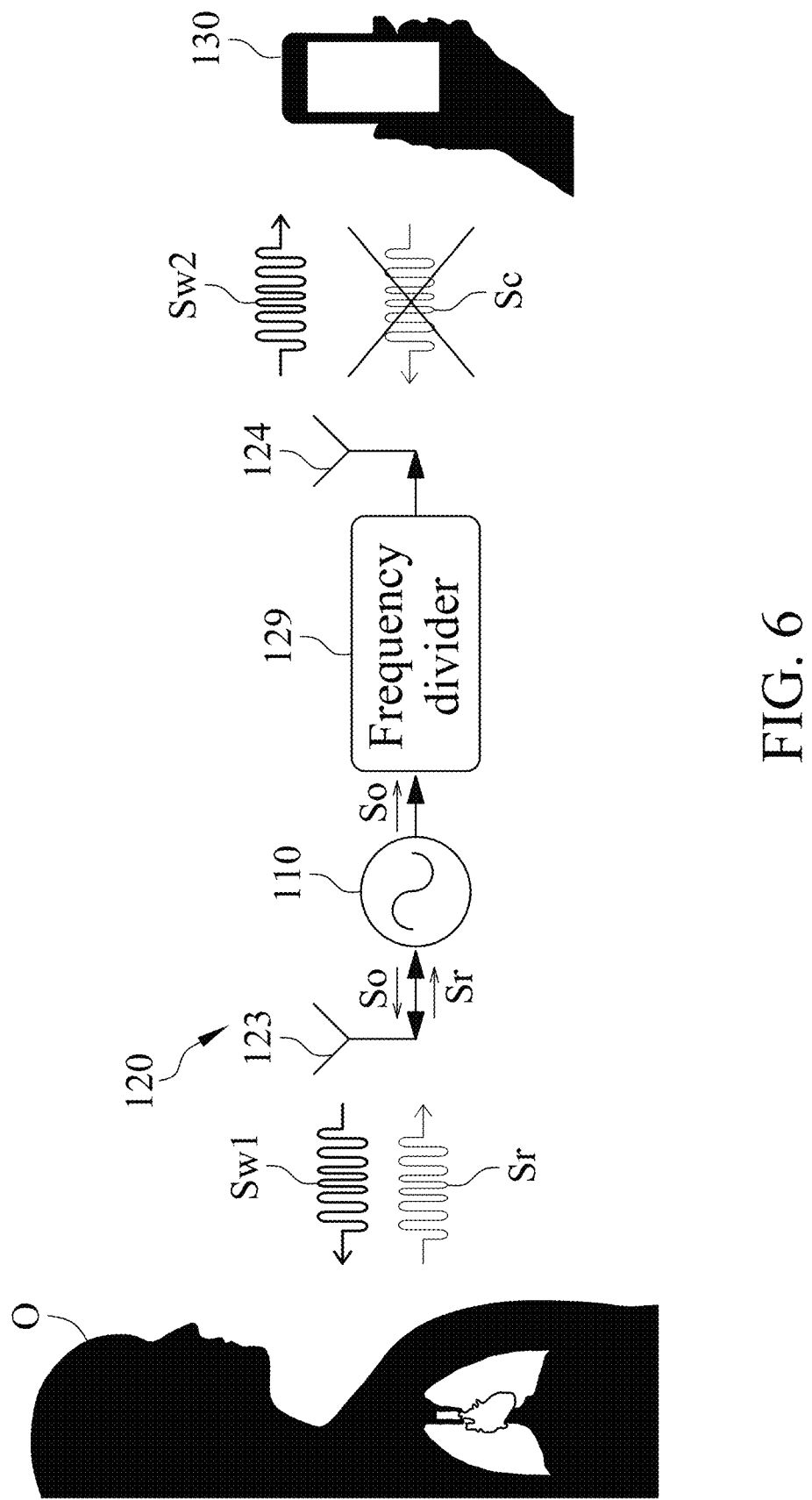
FIG. 6 is a schematic diagram illustrating a vital sign sensor in accordance with a sixth embodiment of the present invention.

With reference to FIG. 6, the isolator of the antenna assembly 120 in a sixth embodiment of the present invention is a frequency divider 129 and there is no restriction to the polarization direction of the second antenna 124. The SIL oscillator 110 is electrically connected with the first antenna 123 which is adapted to radiate the oscillation signal So in a form of a first wireless signal Sw1 to the object O, receive the reflected signal Sr from the object O and input the reflected signal Sr into the SIL oscillator 110. The frequency divider 129 is electrically connected to the SIL oscillator 110 and adapted to receive the oscillation signal So of the SIL oscillator 130 for frequency reduction. The second antenna 124, coupled to the SIL oscillator 110 via the frequency divider 129, radiates the frequency-divided oscillation signal So to the demodulator 130 in a form of a second wireless signal Sw2. The clutter Sc, reflected from the demodulator 130 and the environment where the demodulator 130 is located, is transmitted to and received by the second antenna 124. Due to the frequency of the clutter Sc is obviously different to the oscillation frequency of the SIL oscillator 110, the clutter Sc doesn't induce the frequency modulation of the SIL oscillator 110.

Figure 7:
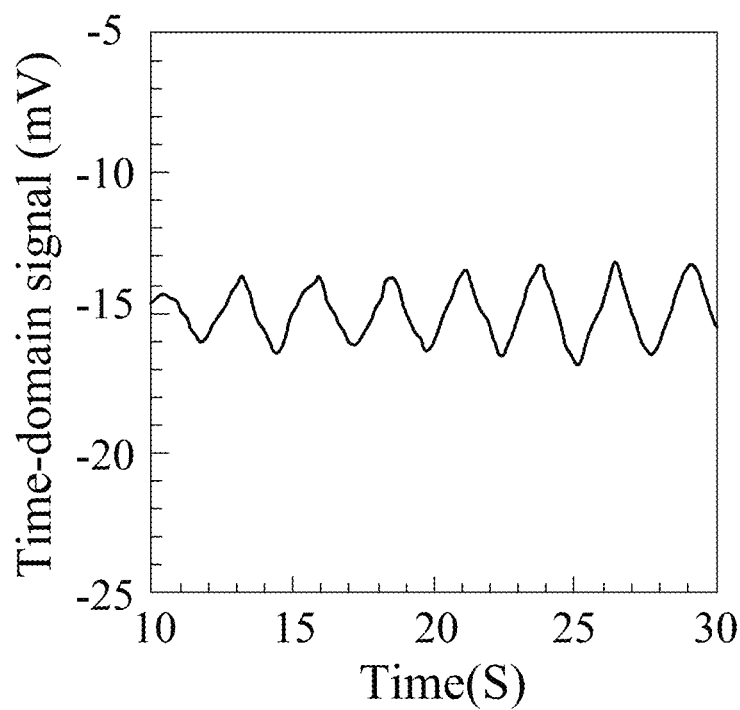
FIG. 7 is detection results of human vital sign using the vital sign sensor in accordance with the first embodiment of the present invention.
Figure 8:
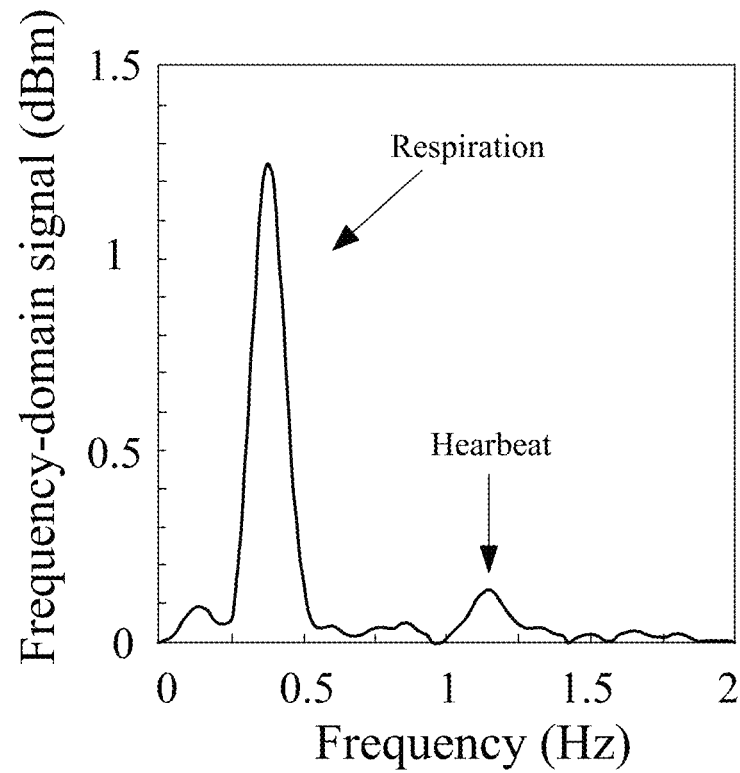
FIG. 8 is detection results of human vital sign using the vital sign sensor in accordance with the first embodiment of the present invention.

With reference to FIGS. 7 and 8, they are detection results using the vital sign sensor 100 of the first embodiment. In this study, the vital sign sensor 100 is placed on a subject's front chest, the demodulator 130 is hand-hold and shaken back and forth irregularly by the subject. The first antenna 123 radiates the first wireless signal Sw1 toward the subject's front chest for detecting the vital signs of the subject. The second wireless signal Sw2 is radiated to the demodulator 130 from the second antenna 124 and demodulated by the demodulator 130. FIGS. 7 and 8 respectively show the time-domain signals $S_{BB}(t)$ and the frequency-domain signals demodulated by the demodulator 130. As shown in FIG. 7, the regular oscillation of the time-domain signals $S_{BB}(t)$ represents that the movement of the demodulator 130 doesn't influence the oscillation frequency of the SIL oscillator 110. FIG. 8 show that the frequency modulations caused by respiration and heartbeat of the subject can be identified clearly. For these reasons, the vital sign sensor 100 of the present invention actually has the advantage of clutter resistance for detecting vital signs accurately.

The scope of the present invention is only limited by the following claims. Any alternation and modification without departing from the scope and spirit of the present invention will become apparent to those skilled in the art.

What is claimed is:

1. A vital sign sensor capable of resisting clutter comprising:
   a self-injection-locked (SIL) oscillator configured to output a oscillation signal;
   an antenna assembly configured to electrically connect with the SIL oscillator, receive the oscillation signal and radiate a wireless signal to an object, and the antenna assembly is configured to receive a reflected signal reflected from the object and transmit the reflected signal to the SIL oscillator to allow the SIL oscillator to operate in a self-injection locked state; and
   a demodulator configured to receive and demodulate the wireless signal radiated from the antenna assembly to obtain a vital signal, wherein a clutter is reflected from the demodulator and an environment where the demodulator is placed, and an isolator of the antenna assembly is configured to prevent the clutter from being transmitted to the SIL oscillator.

2. The vital sign sensor in accordance with claim 1, wherein the antenna assembly includes an antenna configured to radiate the wireless signal and receive the reflected signal, and wherein the isolator includes a frequency selective surface (FSS) placed in a transmitting path of the oscillation signal from the antenna to the demodulator, the FSS is configured to prevent the antenna from receiving the clutter reflected from the demodulator and the environment where the demodulator is placed.

3. The vital sign sensor in accordance with claim 2, wherein there is only one antenna in the antenna assembly.

4. The vital sign sensor in accordance with claim 1, wherein the antenna assembly includes a first antenna and the isolator includes a second antenna, the first and second antennas are coupled to the SIL oscillator, wherein the first antenna is configured to radiate a first wireless signal to the object and receive the reflected signal from the object, and the second antenna is configured to radiate a second wireless signal to the demodulator and prevent to receive the clutter reflected from the demodulator and the environment where the demodulator is placed, and wherein the second antenna is an array antenna with right-hand or left-hand circular polarization.

5. The vital sign sensor in accordance with claim 4 further comprising a power splitter electrically connected to the SIL oscillator, wherein the power splitter is configured to split the oscillation signal into two paths, the oscillation signal in one path is configured to transmit to the first antenna and the oscillation signal in the other path is configured to transmit to the second antenna.

6. The vital sign sensor in accordance with claim 4, wherein a polarization direction of the second wireless signal radiated from the second antenna to the demodulator and a polarization direction of the clutter reflected from the demodulator and the environment are in quadrature with each other.

7. The vital sign sensor in accordance with claim 1, wherein the antenna assembly includes a first antenna and a second antenna and the isolator includes a buffer, the buffer and the first antenna are electrically connected to the SIL oscillator, and the second antenna is coupled to the SIL oscillator via the buffer, wherein the first antenna is configured to radiate a first wireless signal to the object and receive the reflected signal from the object, the second antenna is configured to radiate a second wireless signal to the demodulator, and the buffer is configured to prevent the clutter reflected from the demodulator and the environment from being transmitted to the SIL oscillator.

8. The vital sign sensor in accordance with claim 1, wherein the antenna assembly includes a first antenna and a second antenna, and the isolator includes a frequency mixer and a local oscillator, wherein the frequency mixer is configured to electrically connect with the SIL oscillator and the local oscillator, receive and mix the oscillation signal from the SIL oscillator and a local oscillation signal from the local oscillation signal to a frequency mixing signal, wherein the first antenna, is configured to electrically connect to the SIL oscillator, radiate a first wireless signal to the object and receive the reflected signal from the object, and wherein the second antenna is configured to electrically connect with the frequency mixer, receive the frequency mixing signal and radiate a second wireless signal to the demodulator.

9. The vital sign sensor in accordance with claim 1, wherein the antenna assembly includes a first antenna and a second antenna, and the isolator includes a frequency multiplier, the frequency multiplier and the first antenna are electrically connected with the SIL oscillator, and the second antenna is coupled to the SIL oscillator via the frequency multiplier, wherein the first antenna is configured to radiate a first wireless signal to the object and receive the reflected signal from the object, the frequency multiplier is configured to increase a frequency of the oscillation signal, and the second antenna is configured to radiate a second wireless signal to the demodulator.

10. The vital sign sensor in accordance with claim 1, wherein the antenna assembly includes a first antenna and a second antenna, and the isolator includes a frequency divider, the frequency divider and the first antenna are electrically connected to the SIL oscillator, and the second antenna is coupled to the SIL oscillator via the frequency divider, wherein the first antenna is configured to radiate a first wireless signal to the object and receive the reflected signal from the object, the frequency divider is configured to decrease a frequency of the oscillation signal, and the second antenna is configured to radiate a second wireless signal to the demodulator.

* * * * *